(12) United States Patent
Zhao (10) Patent No.: US 12,393,758 B2
(45) Date of Patent: Aug. 19, 2025

(54) AUTOMATIC LAYOUT METHOD FOR PAD RING USED FOR OPTIMIZING ELECTROSTATIC DISCHARGING CAPACITY OF CHIP

(71) Applicant: Dongke Semiconductor (Anhui) CO., LTD, Anhui (CN)

(72) Inventor: Shaofeng Zhao, Anhui (CN)

(73) Assignee: Dongke Semiconductor (Anhui) CO., LTD, Anhui (CN)

( * ) Notice: Subject to any disclaimer, the term of this patent is extended or adjusted under 35 U.S.C. 154(b) by 478 days.

(21) Appl. No.: 17/595,632

(22) PCT Filed: Oct. 26, 2020

(86) PCT No.: PCT/CN2020/123587
§ 371 (c)(1),
(2) Date: Apr. 12, 2022

(87) PCT Pub. No.: WO2021/196574
PCT Pub. Date: Oct. 7, 2021

(65) Prior Publication Data
US 2023/0205962 A1 Jun. 29, 2023

(30) Foreign Application Priority Data
Mar. 30, 2020 (CN) .......................... 202010236818.9

(51) Int. Cl.
*G06F 30/30* (2020.01)
*G06F 30/392* (2020.01)
(Continued)

(52) U.S. Cl.
CPC .......... *G06F 30/392* (2020.01); *G06F 30/398* (2020.01); *G06F 2113/18* (2020.01); *G06F 2119/06* (2020.01)

(58) Field of Classification Search
None
See application file for complete search history.

(56) References Cited

U.S. PATENT DOCUMENTS

| 5,847,969 A | 12/1998 | Miller et al. |
| 6,057,169 A * | 5/2000 | Singh ...................... G06F 30/39 |
| | | 257/E23.079 |

(Continued)

FOREIGN PATENT DOCUMENTS

| CN | 101145169 A | 3/2008 |
| CN | 106784609 A | 5/2017 |

(Continued)

OTHER PUBLICATIONS

D. C. Wang et al., 27th ACM/IEEE Design Automation Conference, Paper 10.3, 1990 IEEE, pp. 193-199. (Year: 1990).*

(Continued)

*Primary Examiner* — Leigh M Garbowski
(74) *Attorney, Agent, or Firm* — TraskBritt (57) ABSTRACT

An automatic layout method for a pad ring used for optimizing the electrostatic discharge capability of a chip, comprising: determining, on the basis of information of a selected process library and of package constraint information, the types and number of signal lead modules of a chip, and combined with designed total power consumption data, determining the types of power lead modules and a basic required number corresponding to each type of power lead modules; producing, on the basis of the types and the numbers of the signal lead cells and of that of the power supply lead modules and of the package constraint information, groups of lead modules to be laid out respectively for four boundaries; executing a first automatic layout with respect to each boundary; and executing a second automatic (Continued)

layout on the basis of the size of a remaining gap when the first automatic layout is executed.

6 Claims, 6 Drawing Sheets

(51) Int. Cl.
*G06F 30/398* (2020.01)
*G06F 113/18* (2020.01)
*G06F 119/06* (2020.01)

(56) References Cited

U.S. PATENT DOCUMENTS

| | | | |
|---|---|---|---|
| 6,725,439 | B1 | 4/2004 | Homsinger et al. |
| 9,064,938 | B2 * | 6/2015 | Etherton ........... H01L 21/76895 |
| 9,577,640 | B1 * | 2/2017 | Park .................. H03K 19/1732 |
| 10,134,728 | B2 * | 11/2018 | Mathur ............... H01L 27/0629 |
| 2008/0201677 | A1 * | 8/2008 | Baker ..................... H01L 22/20 |
| | | | 716/132 |
| 2017/0255741 | A1 | 9/2017 | Sharma et al. |
| 2019/0027780 | A1 | 1/2019 | Liu et al. |

FOREIGN PATENT DOCUMENTS

| | | |
|---|---|---|
| CN | 108598563 A | 9/2018 |
| CN | 109478684 A | 3/2019 |
| CN | 109871567 A | 6/2019 |
| CN | 110502799 A | 11/2019 |
| CN | 109684745 B | 4/2020 |
| CN | 111446238 B | 4/2021 |
| CN | 109284578 B | 6/2021 |
| CN | 106528921 B | 11/2021 |
| EP | 3503180 A1 | 6/2019 |
| JP | 2001-298091 A | 10/2001 |
| JP | 2006-179931 A | 7/2006 |
| JP | 2008-061799 A | 3/2008 |

OTHER PUBLICATIONS

Japanese Notification of Reasons for Refusal for Application No. 2021-557700 dated Nov. 22, 2020, 4 pages.
Japanese Notification of Reasons for Refusal for Application No. 2021-569339 dated Oct. 4, 2020, 3 pages.
Chinese First Office Action for Application No. 202010236818.9 dated Jan. 25, 2021, 10 pages with translation.
International Search Report for International Application No. PCT/CN2020/123587 mailed Jan. 27, 2021, 2 pages.
International Written Opinion for International Application No. PCT/CN2020/123587 mailed Jan. 27, 2021, 4 pags.

* cited by examiner

AUTOMATIC LAYOUT METHOD FOR PAD RING USED FOR OPTIMIZING ELECTROSTATIC DISCHARGING CAPACITY OF CHIP

CROSS-REFERENCE TO RELATED APPLICATIONS

This application is a national phase entry under 35 U.S.C. § 371 of International Patent Application PCT/CN2020/123587, filed Oct. 26, 2020, designating the United States of America and published as International Patent Publication WO 2021/196574 A1 on Oct. 7, 2021, which claims the benefit under Article 8 of the Patent Cooperation Treaty to Chinese Patent Application Serial No. 202010236818.9, filed Mar. 30, 2020.

TECHNICAL FIELD

The present disclosure relates to the technical field of microelectronics, in particular, to an automatic layout method for PAD ring used for optimizing the electrostatic discharge capability of a chip.

BACKGROUND

During chip designing, floorplan is a design step that determines the positions of circuit components such as a core element and a macro cell in a chip. By assigning physical positions to components such as the element and the macro cell on the layout, the components such as the element and the macro cell will not overlap with each other. The assignment requires the optimization of a cost function according to specific constraints given by a user. After floorplan design, the exact positions of elements and their pins have been determined, and required interconnection has also been determined. The floorplan discussed usually focus on the core area in a chip. For chip designing, another key layout step is to place pads to form a PAD ring.

Electrostatic discharge (ESD) is the main cause of electrical overstress (EOS) of all electronic devices or integrated circuit systems. Because the instantaneous electrostatic voltage is usually very high (several thousand volts or more), such damage is devastating and permanent, which may cause a circuit to be directly broken down. Therefore, it is a major task for chip designing and manufacturing to prevent electrostatic damage.

ESD is also an important task of the PAD ring. The module responsible for electrostatic discharge is usually located next to signal pads, not inside a chip, because external electrostatic charge needs to be dissipated immediately.

An automatic PAD ring layout method commonly used in the industry at present features completely random layout under constraint conditions, for example, a layout based on the order of pad cell names. As a result, the automatic generated layout cannot meet the requirements of chip designers at all, not to mention how to automatically select a PAD ring layout solution with higher ESD capability. Experienced chip designers often use a manual layout method rather than the automatic layout method to make the layout of the PAD ring meet designing requirements, and then optimize the design by manually adjusting the layout.

BRIEF SUMMARY

The purpose of the present disclosure is to provide an automatic PAD ring layout method for optimizing the ESD capability of a chip to overcome the defects of the prior art.

In view of this, an embodiment of the present disclosure provides an automatic PAD ring layout method for optimizing the ESD capability of a chip, comprising:

acquiring design total power consumption data, area constraint information, package constraint information and core position information of the chip and selected technology library information of chip design, the core position information including boundary position coordinates of the core area;

determining position information of a PAD ring of the chip according to the area constraint information and the boundary position coordinates of the core area, the PAD ring having four boundaries, and the position information of the PAD ring including position coordinates and width information of each of the boundaries of the PAD ring;

determining the types and quantity of Signal PADs of the chip according to the selected technology library information and the package constraint information;

determining the types of power lead cells and the basic demand quantity corresponding to each power lead cell group according to the design total power consumption data and the types and quantity of the Signal PADs, the types of the power lead cells including a first power lead cell group and a second power lead cell group, the first power lead cell group comprising a first level lead cell Vss PAD and a second level lead cell Vdd Pad, and the second power lead cell group comprising a first level input/output lead cell Vss IO PAD and a second level input/output lead cell Vdd IO Pad;

classifying the Signal PADs, the first power lead cell group and the second power lead cell group into four groups of lead cells to be laid out based on the types and quantity of the Signal PADs, the types of the power lead cells and the basic demand quantity corresponding to each power lead cell group and the package constraint information, the four groups of lead cells to be laid out having a one-to-one corresponding relationship with the four boundaries;

executing first automatic layout for each of the boundaries, the first automatic layout comprising: selecting a vertex of the boundary according to boundary position coordinates of the PAD ring, and determining position coordinates of the selected boundary vertex as layout starting point coordinates of the boundary; taking the starting point coordinates as a starting point, calling and inserting a corner cell from a technology library, and recording ending position coordinates of the corner cell; according to the ending position coordinates of the corner cell and the lead cell to be laid out corresponding to the boundary, so that the required Signal PAD, the first power lead cell group and/or the second power lead cell group are called and inserted based on the technology library in turn, and recording ending position coordinates after each insertion; and calculating a size of a residual gap after executing the first automatic layout for each of the boundaries according to the ending position coordinates after the last insertion, a boundary vertex of an adjacent boundary and a cell size of the corner cell, and executing a second automatic layout according to the size of the residual gap, so as to optimize the ESD capability of the chip;

the second automatic layout specifically comprising:
insert one or more first power lead cell groups into the residual gap when the size of the residual gap is greater than or equal to a lateral size of the first power lead cell group;

insert one second power lead cell group into the residual gap when the size of the residual gap is smaller than the lateral size of the first power lead cell group and greater than or equal to a lateral size of the second power lead cell group; and insert one first level lead cell Vss PAD into the residual gap when the size of the residual gap is smaller than the lateral sizes of the first power lead cell group and the second power lead cell group, but greater than or equal to the lateral size of the first level lead cell Vss PAD.

Preferably, the method further comprises:

calculating a size of a secondary residual gap after the second automatic layout is performed on each boundary according to ending position coordinates after the last insertion of the second automatic layout, a boundary vertex of an adjacent boundary and a cell size of a corner cell, according to the size of the secondary residual gap, and calling and inserting one or more filler cells by the technology library to fill the secondary residual gap.

Preferably, determining the types and quantity of Signal PADs of the chip according to the selected technology library information and the package constraint information specifically comprises:

extracting the types of required Signal PADs from the selected technology library according to the package constraint information, and determining the quantity of each type of Signal PADs, different types of Signal PADs having their own lateral sizes.

Preferably, determining the types of power lead cells and the basic demand quantity corresponding to each power lead cell group according to the design total power consumption data and the types and quantity of the Signal PADs specifically comprises:

calculating maximum energy consumption when signals output by the Signal PADs are simultaneously switching, and determining minimum layout quantities of the first level input/output lead cell Vss IO PAD and the second level input/output lead cell Vdd IO Pad according to the maximum energy consumption derived before; and calculating minimum initialized quantities of the first level lead cell Vss PAD and the second level lead cell Vdd Pad according to a typical power consumption value in the core area of the chip from the total power consumption data in the design.

Preferably, classifying the Signal PADs, the first power lead cell group and the second power lead cell group into four groups of lead cells to be laid out based on the types and quantity of the Signal PADs, the types of the power lead cells and the basic demand quantity corresponding to each power lead cell group and the package constraint information specifically comprises:

determining the parameters of the placement rule for the Signal PADS according to the package constraint information, the parameters of the placement rule including a maximum distance between the Signal PAD and the first level lead cell Vss PAD with the maximum ESD capability; and distributing each Signal PAD, the first power supply lead cell group and the second power supply lead cell group to a group of lead cells to be laid out according to an even distribution principle based on the maximum distance and the parameters of the placement rule for the Signal PADs, and determining sorting position information in the group.

Preferably, when the size of the residual gap is less than 0, the method further comprises: outputting a layout error-warning message.

The present disclosure provides an automatic PAD ring layout method for optimizing the ESD capability of a chip, which is based on the design total power consumption data, the area constraint information, the package constraint information, the core area position information and the selected technology library information of chip design, positions a PAD ring, determines the types and required quantity of the Signal PADs arranged in the PAD ring, the types of the power lead cells and the basic demand quantity of each power lead cell group, performs the first automatic layout on each boundary of the PAD ring, so as to automatically insert the corner cell, the Signal PADs and the power lead cells, then performs residual gap insertion according to the principle that the first level lead cell Vss PAD with the maximum ESD capability is placed first, and finally, performs random automatic layout on the residual gaps, which are insufficient for Vss Pad insertion and inserts filler cells in the residual gaps.

BRIEF DESCRIPTION OF THE DRAWINGS

The technical solution of the embodiments of the present disclosure will be described in further detail below with reference to the drawings and embodiments.

DETAILED DESCRIPTION

An embodiment of the present disclosure provides an automatic PAD ring layout method for optimizing the ESD capability of a chip, which is based on design total power consumption data, area constraint information, package constraint information, core area position information and technology library information of chip design, positions a PAD ring, determines the types and required quantity of signal lead cells arranged in the PAD ring, the types of power lead cells and the basic demand quantity of each power lead cell group, performs automatic layout on each boundary of the PAD ring, and then performs residual gap insertion according to the principle that a first level lead cell Vss PAD with the maximum ESD capability is placed first.

Figure 1:
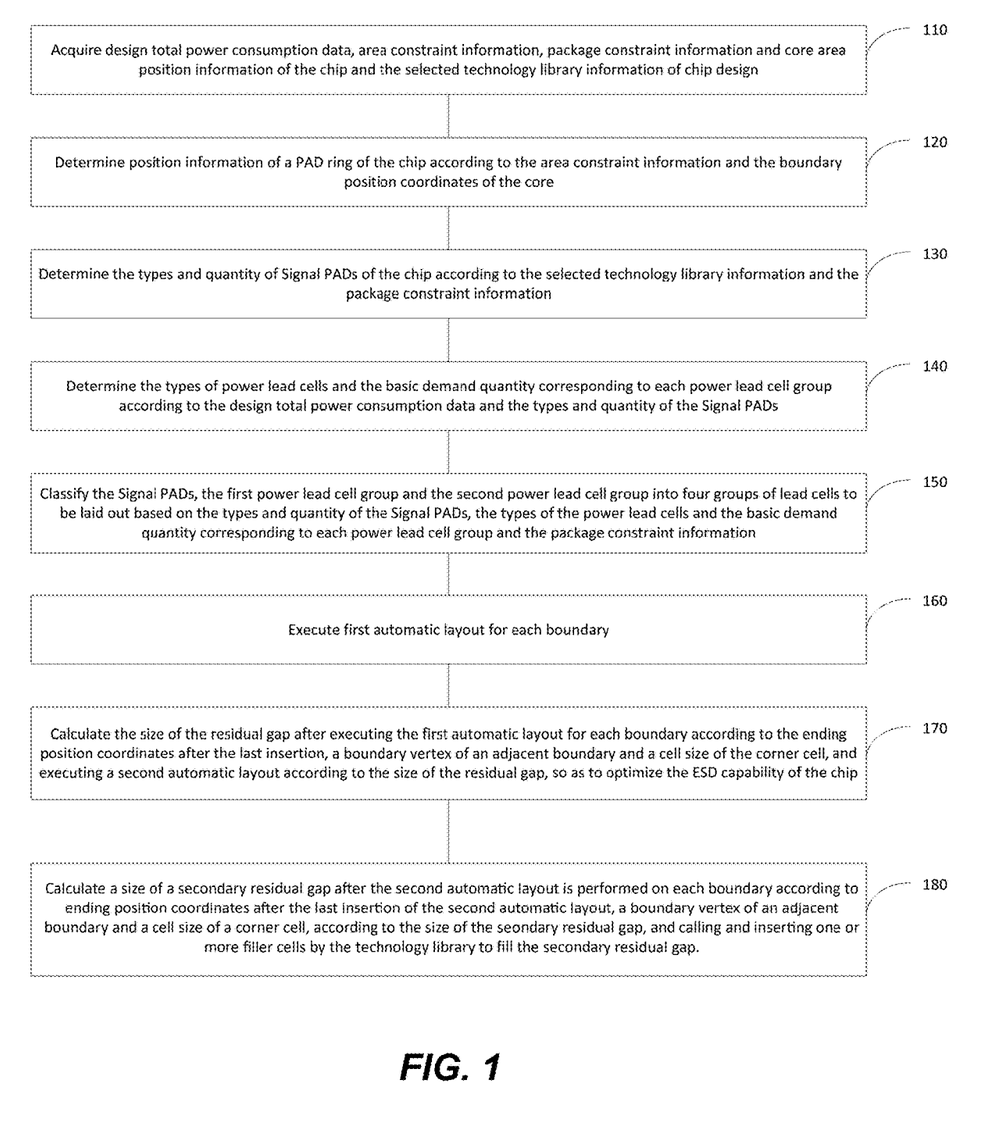
FIG. 1 is a flowchart of an automatic PAD ring layout method in chip design provided by an embodiment of the present disclosure.

The main execution steps of the automatic layout method provided by the embodiment of the present disclosure are shown in the method flowchart illustrated by FIG. 1.

Step 110, acquiring design total power consumption data, area constraint information, package constraint information and core area position information of the chip and the selected technology library information of chip design.

Specifically, chip design involves information about the total power consumption of chip design, chip area constraints, package constraints, and an adopted technology library based on design requirements. After obtaining the chip area constraints, a core position is also determined at the beginning of chip design. The core position information includes boundary position coordinates of a core. The elements of the core are included in the netlist generated by synthesis, and the core is mainly used to realize the logic function of the chip.

Step 120, determining position information of a PAD ring of the chip according to the area constraint information and the boundary position coordinates of the core.

Specifically, the netlist generated by synthesis does only include the elements of the core usually, and does not include a power supply, a ground Pad cell, a corner cell or the like. After determining the chip area constraint information and the boundary position coordinates of the core, a width of a PAD ring may be determined according to boundaries of the chip and the core corresponding to the chip area constraint information, and its position information may also be determined.

Figure 2:
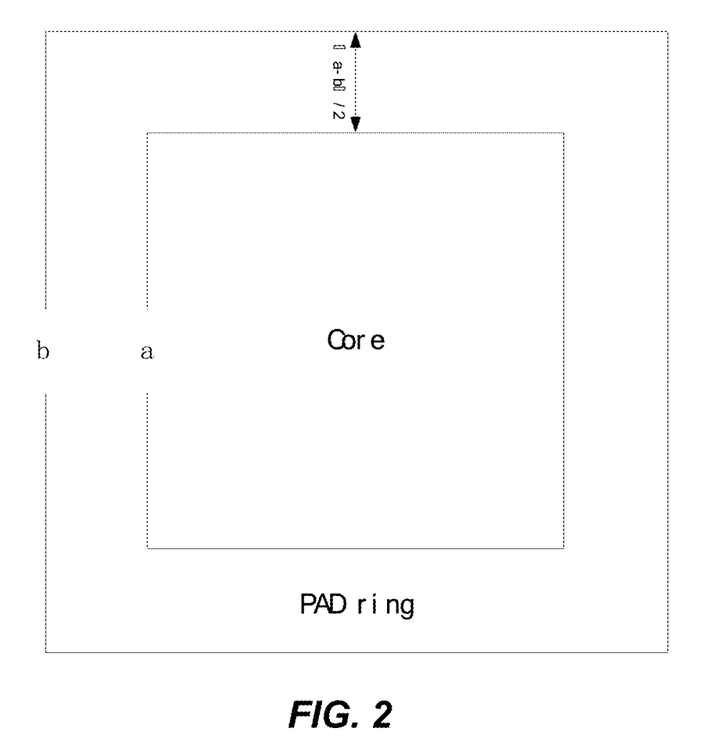
FIG. 2 is a first process diagram of filling ring layout by an automatic layout method provided by an embodiment of the present disclosure.

As shown in FIG. 2, according to the chip area constraint information, it is determined that a boundary length of the chip is a, and a boundary length of the core is b, so the width of the PAD ring is (a-b)/2, and its length is the same as the boundary length a of the chip.

The PAD ring has four boundaries. The position information of the PAD ring includes position coordinates and width information of each boundary of the PAD ring.

For example, in FIG. 2, the coordinates of a vertex at the upper left corner of the core are (x,y), so the coordinates of a vertex at the upper left corner of the PAD ring are (x-(a-b)/2, y-(a-b)/2).

The PAD ring of the chip includes a power supply, a ground Pad cell, a corner cell and the like. Specifically, in this embodiment, Signal PADs, power lead cells, corner cells and filler cells of the chip are included.

Step 130, determining the types and quantity of Signal PADs of the chip according to the selected technology library information and the package constraint information.

Specifically, the technology library is selected before chip design according to the specific process used for chip manufacturing and design tools, and each technology library has corresponding regulations on the size and function of each cell in the PAD ring of the chip.

Each cell in the PAD ring varies according to the functions of an IO port. Some cells realize voltage level shift and drive, while others have an ESD protection function. Under ESD stress, a large current flows by, which tends to cause the latch-up effect. Therefore, the latch-up effect must be considered in the specific design. The influence of the wiring of each cell on a circuit is mainly the influence of parasitic parameters of the wiring on circuit performance.

The package constraint information refers to how many Signal PADs with what functions are required according to logic function requirements of the chip during packaging. Therefore, the types of required Signal PADs may be extracted from the selected technology library according to the package constraint information, and the quantity of each type of Signal PADs is determined. Different types of Signal PADs have their own lateral sizes.

Step 140, determining the types of power lead cells and the basic demand quantity corresponding to each power lead cell group according to the design total power consumption data and the types and quantity of the Signal PADs.

Specifically, the types of the power lead cells include a first power lead cell group and a second power lead cell group, the first power lead cell group comprises a first level lead cell Vss PAD and a second level lead cell Vdd Pad, and the second power lead cell group comprises a first level input/output lead cell Vss IO PAD and a second level input/output lead cell Vdd IO Pad.

The first power lead cell group is used for supplying power to cells inside the core, i.e., core ground, and the second power lead cell group is used for driving and supplying power to the Signal PADs, i.e., pad ground, and voltage discharge protection, etc.

Maximum energy consumption is calculated when signals output by the Signal PADs are simultaneously reversed, and minimum quantities of the first level input/output lead cell Vss IO PAD and the second level input/output lead cell Vdd IO Pad are determined according to the maximum energy consumption; and Minimum quantities of the first level lead cell Vss PAD and the second level lead cell Vdd Pad are calculated according to a typical power consumption value in the core of the chip in the design total power consumption data.

Step 150, classifying the Signal PADs, the first power lead cell group and the second power lead cell group into four groups of lead cells to be laid out based on the types and quantity of the Signal PADs, the types of the power lead cells and the basic demand quantity corresponding to each power lead cell group and the package constraint information.

Specifically, the package constraint information also specifies some specific signal pins need to be led out from which side of the chip, so that the Signal Pads are arranged according to this package constraint information, and if there is no specific requirement, the Signal Pads are arranged at the four boundaries as even as possible.

Arranging the Signal Pads in the PAD ring according to the package constraint information also needs to follow another rule, that is, a maximum distance between the Signal PAD and a power lead cell for ESD is specified. That is, the parameters of the placement rule for the Signal PADs may be determined according to the package constraint information, and the placement rule parameters include a maximum distance between the Signal PAD and the first level lead cell Vss PAD with the maximum ESD capability.

Each Signal PAD, the first power supply lead cell group and the second power supply lead cell group are distributed to a group of lead cells to be laid out according to an even distribution principle based on the maximum distance and the parameters of the placement rule for the Signal PADs, and sorting position information in the group is determined. Therefore, automatic arrangement of the Signal PADs, the first power lead cell group and the second power lead cell group is realized.

The four groups of lead cells to be laid out have a one-to-one corresponding relationship with the four boundaries.

Step 160, executing first automatic layout for each boundary.

Figure 6:
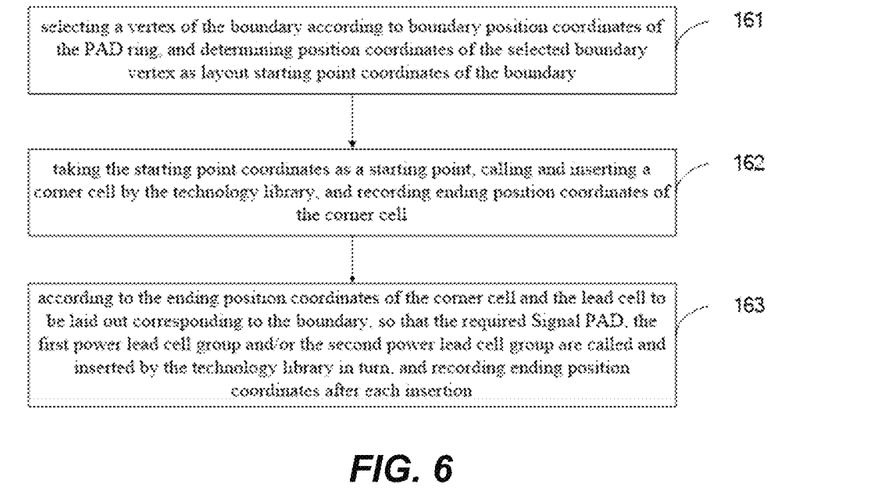
FIG. 6 is a flowchart of a first automatic layout method provided by an embodiment of the present disclosure.

As shown in FIG. 6, the first automatic layout comprises:
step 161, selecting a vertex of the boundary according to boundary position coordinates of the PAD ring, and determining position coordinates of the selected boundary vertex as layout starting point coordinates of the boundary;

step 162, taking the starting point coordinates as a starting point, calling and inserting a corner cell by the technology library, and recording ending position coordinates of the corner cell, wherein the corner cell is a cell used to fill blanks between elements at a junction of horizontal and vertical boundaries; and step 163, according to the ending position coordinates of the corner cell and the lead cell to be laid out corresponding to the boundary, the required Signal PAD, the first power lead cell group and/or the second power lead cell group are called and inserted by the technology library in turn, and recording ending position coordinates after each insertion.

According to the constraint information mentioned above, one or more Signal PADs may be called once, and then one or more of the first power lead cell group and/or the second power lead cell group may be called once, as long as the Signal PADs have the first power lead cell group and the second power lead cell group within the constraint conditions.

Figure 3:
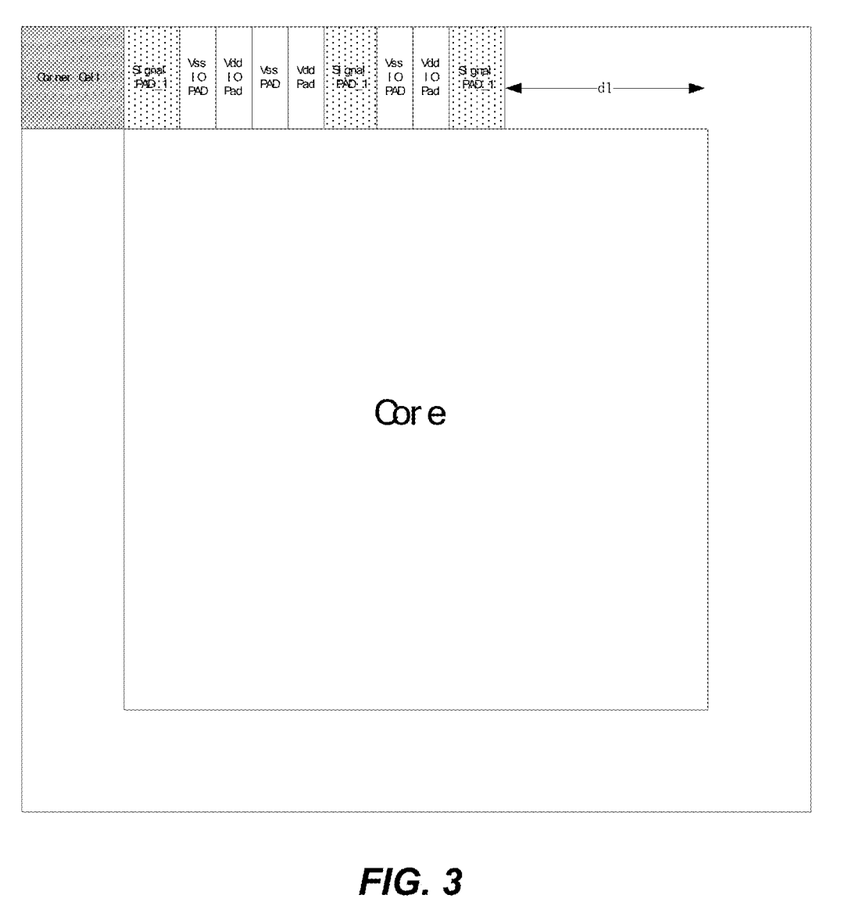
FIG. 3 is a second process diagram of filling ring layout by an automatic layout method provided by an embodiment of the present disclosure.

After completing the layout of one boundary according to the above method, in a specific example, its floorplan layout is shown in FIG. 3. The process on each boundary may be carried out according to the above process synchronously or one after another. After the layout shown in FIG. 3 is obtained, the cells in the PAD ring are capable of meeting the requirements for the driving capability of the chip itself and the ESD capability.

In some cases, design constraints may be inconsistent with chip size requirements and actual logic and driving capability requirements for the chip, and the size of the residual gap may be less than 0. In this case, a layout error-warning message will be output to remind chip designers that they need to return to netlist design again and will not perform the automatic layout of the PAD ring.

Step 170, calculating the size of the residual gap after executing the first automatic layout for each boundary according to the ending position coordinates after the last insertion, a boundary vertex of an adjacent boundary and a cell size of the corner cell, and executing a second automatic layout according to the size of the residual gap, so as to optimize the ESD capability of the chip.

In order to improve the ESD capability of the chip, the first power lead cell group including Vss PAD with the highest ESD capability is preferentially inserted in the residual gap in the mode of cell group.

Figure 7:
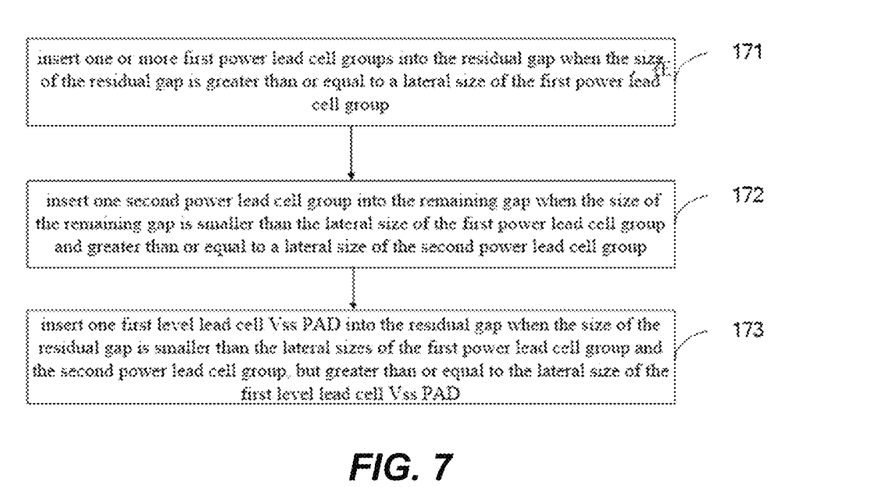
FIG. 7 is a flowchart of a second automatic layout method provided by an embodiment of the present disclosure.

In the specific implementation of the present disclosure, as shown in FIG. 7, the implementation process of the second automatic layout method may be specifically as follows:

Step 171, insert one or more first power lead cell groups into the residual gap when the size of the residual gap is greater than or equal to a lateral size of the first power lead cell group;

Step 172, insert one second power lead cell group into the remaining gap when the size of the remaining gap is smaller than the lateral size of the first power lead cell group and greater than or equal to a lateral size of the second power lead cell group; and Step 173, insert one first level lead cell Vss PAD into the residual gap when the size of the residual gap is smaller than the lateral sizes of the first power lead cell group and the second power lead cell group, but greater than or equal to the lateral size of the first level lead cell Vss PAD.

In the diagram shown in FIG. 3, the residual gap is shown as the area marked with d1. The second automatic layout is executed in this area to fill the area.

In this example, one first power lead cell group is first inserted, and the residual gap is insufficient for the insertion of the second power lead cell group, but one first level lead cell Vss PAD may be inserted, so one first level lead cell Vss PAD is then inserted. After completing the second automatic layout in this step, the cell layout of one boundary is shown in FIG. 4.

Step 180, calculating a size of a secondary residual gap after the second automatic layout is performed on each boundary according to ending position coordinates after the last insertion of the second automatic layout, a boundary vertex of an adjacent boundary and a cell size of a corner cell, according to the size of the secondary residual gap, and calling and inserting one or more filler cells by the technology library to fill the secondary residual gap.

Figure 4:
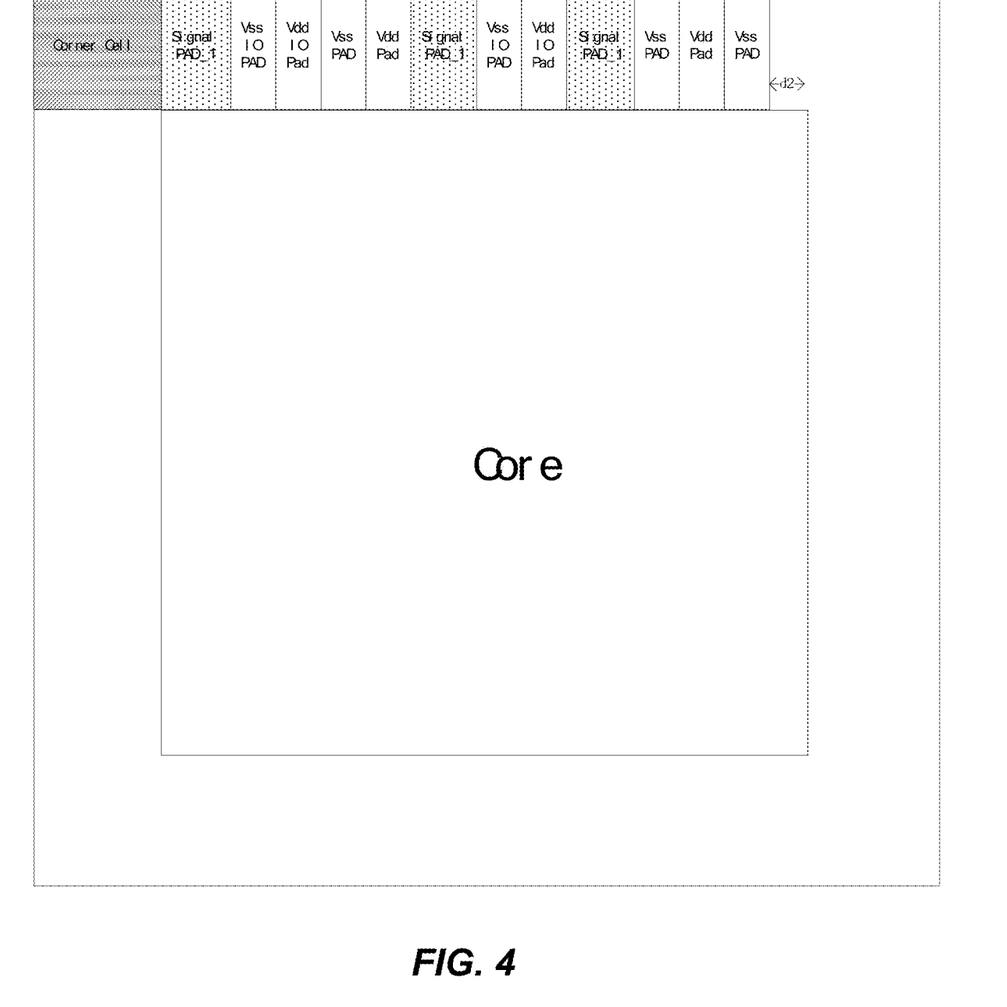
FIG. 4 is a third process diagram of filling ring layout by an automatic layout method provided by an embodiment of the present disclosure.

In FIG. 4, the secondary residual gap is shown as the position marked with d2.

The filler cell refers to a filler unrelated to logic in the selected technology library, which may be divided into an input/output filler cell and a common standard cell filler.

An IO filler, also called pad filler, is used to fill a gap of the PAD ring.

Figure 5:
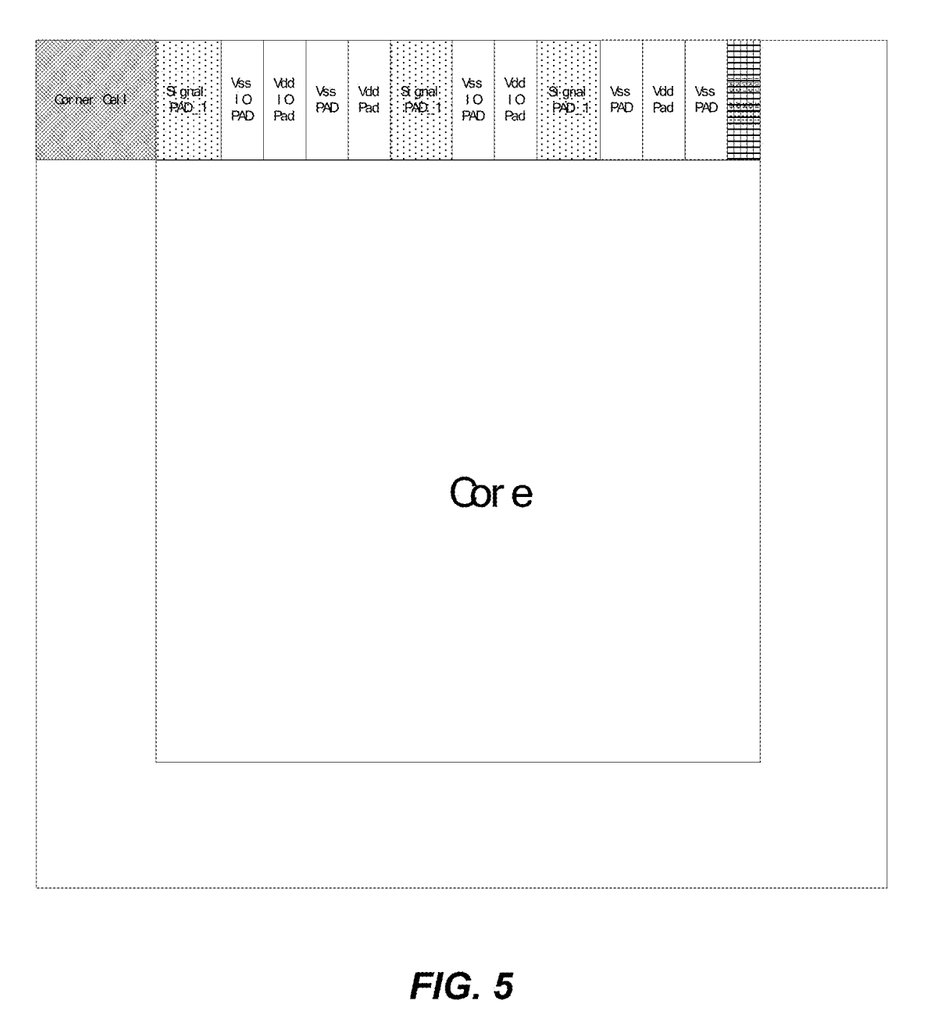
FIG. 5 is a fourth process diagram of filling ring layout by an automatic layout method provided by an embodiment of the present disclosure.

In this example, one boundary on the layout of a module after automatic layout completed is shown in FIG. 5.

The present disclosure provides an automatic PAD ring layout method for optimizing the ESD capability of a chip, which is based on the design total power consumption data, the area constraint information, the package constraint information, the core position information and the selected technology library information of chip design, positions a PAD ring, determines the types and required quantity of the Signal PADs arranged in the PAD ring, the types of the power lead cells and the basic demand quantity of each power lead cell group, performs the first automatic layout on each boundary of the PAD ring, so as to automatically insert the corner cell, the Signal PADs and the power lead cells, then performs residual gap insertion according to the principle that the first level lead cell Vss PAD with the maximum ESD capability is placed first, and finally, performs random automatic layout on the residual gaps, which are insufficient for Vss Pad insertion and inserts filler cells in the residual gaps.

The above-mentioned specific embodiments further explain the purpose, technical scheme and beneficial effects of the present disclosure in detail. It should be understood that the above are only specific embodiments of the present disclosure and are not used to limit the scope of protection of the present disclosure. Any modifications, equivalent substitutions, improvements, etc., made within the spirit and principles of the present disclosure should be included in the scope of protection of the present disclosure.

What is claimed is:

1. An automatic layout method for PAD Ring used for optimizing Electrostatic Discharge (ESD) capability of Chip, comprising:

acquiring design total power consumption data, area constraint information, package constraint information and core position information of the chip and selected technology library information of chip design, the core position information including boundary position coordinates of a core area;

determining position information of a PAD ring of the chip according to the area constraint information and the boundary position coordinates of the core area, the PAD ring having four boundaries, and the position information of the PAD ring including position coordinates and width information of each of the boundaries of the PAD ring;

determining the types and quantity of Signal PADs of the chip according to the selected technology library information and the package constraint information;

determining the types of power lead cells and the basic demand quantity corresponding to each power lead cell group according to the design total power consumption data and the types and quantity of the Signal PADs, the types of the power lead cells including a first power lead cell group and a second power lead cell group, the first power lead cell group comprising a first level lead cell Vss PAD and a second level lead cell Vdd Pad, and the second power lead cell group comprising a first level input/output lead cell Vss IO PAD and a second level input/output lead cell Vdd IO Pad;

classifying the Signal PADs, the first power lead cell group and the second power lead cell group into four groups of lead cells to be laid out based on the types and quantity of the Signal PADs, the types of the power lead cells and the basic demand quantity corresponding to each power lead cell group and the package constraint information, the four groups of lead cells to be laid out having a one-to-one corresponding relationship with the four boundaries;

executing first automatic layout for each of the boundaries, the first automatic layout comprising: selecting a vertex of the boundary according to boundary position coordinates of the PAD ring, and determining position coordinates of the selected boundary vertex as layout starting point coordinates of the boundary; taking the starting point coordinates as a starting point, calling and inserting a corner cell by a technology library, and recording ending position coordinates of the corner cell; according to the ending position coordinates of the corner cell and the lead cell to be laid out corresponding to the boundary, se that the required Signal PAD, the first power lead cell group and/or the second power lead cell group are called and inserted based on the technology library in turn, and recording ending position coordinates after each insertion; and calculating a size of a residual gap after executing the first automatic layout for each of the boundaries according to the ending position coordinates after the last insertion, a boundary vertex of an adjacent boundary and a cell size of the corner cell, and executing a second automatic layout according to the size of the residual gap, so as to optimize the ESD capability of the chip;

the second automatic layout comprising:

insert one or more first power lead cell groups into the residual gap when the size of the residual gap is greater than or equal to a lateral size of the first power lead cell group;

insert one second power lead cell group into the residual gap when the size of the residual gap is smaller than the lateral size of the first power lead cell group and greater than or equal to a lateral size of the second power lead cell group; and insert one first level lead cell Vss PAD into the residual gap when the size of the residual gap is smaller than the lateral sizes of the first power lead cell group and the second power lead cell group, but greater than or equal to the lateral size of the first level lead cell Vss PAD.

2. The automatic layout method for PAD Ring according to claim 1, further comprising:

calculating a size of a secondary residual gap after the second automatic layout is performed on each of the boundaries according to ending position coordinates after the last insertion of the second automatic layout, a boundary vertex of an adjacent boundary and a cell size of a corner cell, according to the size of the secondary residual gap, calling and inserting one or more filler cells by the technology library to fill the secondary residual gap.

3. The automatic layout method for PAD Ring according to claim 1, wherein determining the types and quantity of Signal PADs of the chip according to the selected technology library information and the package constraint information comprises:

extracting the types of required Signal PADs from the selected technology library according to the package constraint information, and determining the quantity of each type of Signal PADs, different types of Signal PADs having their own lateral sizes.

4. The automatic layout method for PAD Ring according to claim 1, wherein determining the types of power lead cells and the basic demand quantity corresponding to each power lead cell group according to the design total power consumption data and the types and quantity of the Signal PADs comprises:

calculating maximum energy consumption when signals output by the Signal PADs are simultaneously switching, and determining minimum layout quantities of the first level input/output lead cell Vss IO PAD and the second level input/output lead cell Vdd IO Pad according to the maximum energy consumption derived before; and calculating minimum initialized quantities of the first level lead cell Vss PAD and the second level lead cell Vdd Pad according to a typical power consumption value in the area of the chip from the total power consumption data in the design.

5. The automatic layout method for PAD Ring according to claim 1, wherein classifying the Signal PADs, the first power lead cell group and the second power lead cell group into four groups of lead cells to be laid out based on the types and quantity of the Signal PADs, the types of the power lead cells and the basic demand quantity corresponding to each power lead cell group and the package constraint information comprises:

determining parameters of placement rule for the Signal PADs according to the package constraint information, the parameters of the placement rule including a maximum distance between the Signal PAD and the first level lead cell Vss PAD with the maximum ESD capability; and distributing each Signal PAD, the first power lead cell group and the second power lead cell group to a group of lead cells to be laid out according to an average distribution principle based on the maximum distance and the parameters of the placement rule for the Signal PADs, and determining sorting position information in the group.

6. The automatic layout method for PAD Ring according to claim 1, wherein when the size of the residual gap is less than 0, the method further comprises:

outputting a layout error-warning message.

* * * * *

UNITED STATES PATENT AND TRADEMARK OFFICE
CERTIFICATE OF CORRECTION

PATENT NO. : 12,393,758 B2
APPLICATION NO. : 17/595632
DATED : August 19, 2025
INVENTOR(S) : Shaofeng Zhao It is certified that error appears in the above-identified patent and that said Letters Patent is hereby corrected as shown below:

On the Title Page
In ITEM (54), Lines 3-4, change "ELECTROSTATIC DISCHARGING CAPACITY OF CHIP" to --ELECTROSTATIC DISCHARGE CAPABILITY OF CHIP--

In the Specification
Column 1, Lines 3-4, change "ELECTROSTATIC DISCHARGING CAPACITY OF CHIP" to --ELECTROSTATIC DISCHARGE CAPABILITY OF CHIP--

Column 3, Line 56, change "Signal PADS according" to --Signal PADs according--

In the Claims
Claim 1, Column 9, Line 39, change "to the boundary se that the required" to --to the boundary, the required--

Signed and Sealed this
Twenty-third Day of September, 2025

John A. Squires
*Director of the United States Patent and Trademark Office*